United States Patent
Fujimori et al.

(10) Patent No.: US 6,771,471 B2
(45) Date of Patent: Aug. 3, 2004

(54) ROTARY HEAD DRUM APPARATUS AND MAGNETIC RECORDING AND PLAYBACK APPARATUS

(75) Inventors: Motoyoshi Fujimori, Chiba (JP); Ichiro Hashimoto, Kanagawa (JP); Akira Itou, Tokyo (JP); Hiroyuki Kaneko, Tokyo (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 10/057,559

(22) Filed: Jan. 25, 2002

(65) Prior Publication Data

US 2002/0105762 A1 Aug. 8, 2002

(30) Foreign Application Priority Data

Jan. 26, 2001 (JP) ..................................... P2001-018642

(51) Int. Cl.[7] ................................................ G11B 5/02
(52) U.S. Cl. .................................................... 360/271.1
(58) Field of Search .............................. 360/271–271.7, 360/130.22–130.24

(56) References Cited

U.S. PATENT DOCUMENTS

| | | | | |
|---|---|---|---|---|
| 4,197,565 A | * | 4/1980 | Watanabe ................. | 360/77.16 |
| 5,299,085 A | * | 3/1994 | Sawai et al. .............. | 360/281.8 |
| 5,724,215 A | * | 3/1998 | Fayolle et al. ........... | 360/281.8 |
| 5,734,529 A | * | 3/1998 | Kang ....................... | 360/281.8 |

FOREIGN PATENT DOCUMENTS

| | | | | |
|---|---|---|---|---|
| EP | 127744 A1 | * | 12/1984 | ............ G11B/5/52 |
| EP | 336422 A2 | * | 10/1989 | ............ G11B/5/53 |
| JP | 58161105 A | * | 9/1983 | ............ G11B/5/02 |
| JP | 04030315 A | * | 2/1992 | ............ G11B/5/52 |
| JP | 04184701 A | * | 7/1992 | ............ G11B/5/02 |
| JP | 05101350 A | * | 4/1993 | ............ G11B/5/53 |
| JP | 08106775 A | * | 4/1996 | ........... G11B/33/14 |
| JP | 11162039 A | * | 6/1999 | ........... G11B/15/00 |
| JP | 2000030430 A | * | 1/2000 | ........... G11B/33/14 |
| JP | 2000251462 A | * | 9/2000 | ........... G11B/33/14 |

* cited by examiner

*Primary Examiner*—William Klimowicz
(74) *Attorney, Agent, or Firm*—Cooper & Dunham LLP

(57) ABSTRACT

A rotary head drum apparatus and a magnetic recording and playback apparatus wherein crosstalk between a writing signal and a playback signal transferred using independent rotary transformers is reduced and facility of assembly and rework of a magnetic head are improved. A flat disk-type rotary transformer for a writing signal and another flat disk-type rotary transformer for a playback signal are disposed adjacently in a stationary drum, and a shield plate for preventing crosstalk is interposed between the two rotary transformers. Alternatively, one of a writing rotary transformer and a playback rotary transformer is formed from a flat disk-type rotary transformer while the other is formed from a cylindrical rotary transformer, and the flat disk-type rotary transformer is disposed on a bottom portion of a stationary drum while the cylindrical rotary transformer is disposed on an outer circumference of a center boss of the stationary drum.

8 Claims, 3 Drawing Sheets

ROTARY HEAD DRUM APPARATUS AND MAGNETIC RECORDING AND PLAYBACK APPARATUS

BACKGROUND OF THE INVENTION

This invention relates to a rotary head drum apparatus and a magnetic recording and playback apparatus, and more particularly to a rotary head drum apparatus and a magnetic recording and playback apparatus wherein a head provided on a rotary head is used to write and/or play back a signal onto and/or from a tape-type recording medium.

In a magnetic recording and playback apparatus of the helical scan type such as a video tape recorder (VTR) wherein a magnetic head contacts with a magnetic tape to effect magnetic recording of the helical scan type onto the magnetic tape, transfer of a signal must be performed between the rotating magnetic head and a circuit on the stationary side. Therefore, as disclosed, for example, in Japanese Patent Laid-Open No. Hei 5-274603, a cylindrical rotary transformer is used, and a stator of the rotary transformer is mounted on an outer circumferential face of a center boss of a stationary drum while a rotor of the rotary transformer is mounted on an inner circumference side of the rotary drum and besides the rotor and the magnetic head are connected to each other by a lead.

However, if it is tried to perform transfer of both of a recording signal and a playback signal at the same time using such a single rotary transformer as disclosed in Japanese Patent Laid-Open No. Hei 5-274603 mentioned above, the recording signal and the playback signal become likely to suffer from deterioration in characteristic by interference, crosstalk or the like on the rotary transformer. This problem is serious particularly where the drum is small in size and besides the video tape recorder is of the multi-channel type wherein many channels are involved. Therefore, a writing rotary transformer and a playback rotary transformer are provided separately from each other so that a writing signal and a playback signal may be transferred separately from each other.

FIG. 3 shows an example of a conventional head drum apparatus which includes a playback rotary transformer and a write rotary transformer provided separately from each other. Referring to FIG. 3, the head drum apparatus shown includes an upper side rotary drum 1, a lower side stationary drum 2, and a motor 3 provided below the stationary drum 2. A magnetic head 4 is mounted on the rotary drum 1 such that it is exposed to the outer circumference of the rotary drum 1.

A playback rotary transformer 6 is disposed above the rotary drum 1. The playback rotary transformer 6 includes a rotor 7 and a stator 8. The rotor 7 is mounted at an upper portion of the rotary drum 1 through a mounting plate 9. Meanwhile, the stator 8 is secured to and supported on a mounting bracket 12 through a mounting plate 10 and an arm 11.

A writing rotary transformer 14 is provided on the inner side of the stationary drum 2. The writing rotary transformer 14 includes a rotor 15 and a stator 16. The rotor 15 is supported on a flange 18 fitted on a rotary shaft 17. Meanwhile, the stator 16 is secured directly to an upper face of a bottom portion of the stationary drum 2.

The rotary shaft 17 is supported for rotation on the stationary drum 2 by a pair of upper and lower bearings 21 and 22. The rotary shaft 17 serves also as a rotary shaft of the motor 3, and a rotor boss 23 of the motor 3 is secured to an end portion of the rotary shaft 17. A rotor yoke 24 is securely mounted on the rotor boss 23, and a ring-shaped magnet 25 is securely mounted on an upper face of the rotor yoke 24.

The magnet 25 of the motor 3 is opposed to a coil 26 with an air gap left therebetween. The coil 26 is mounted on a printed circuit board 27. A shield plate 28 is disposed above the printed circuit board 27, and an outer peripheral wall of the motor 3 is formed from a casing 29 secured to a lower face of the stationary drum 2.

In the head drum apparatus having such a configuration as described above, when the coil 26 on the printed circuit board 27 of the motor 3 is energized, then the magnet 25 mounted on the rotor yoke 24 is acted upon by a force in its rotational direction thereby to rotate the motor 3. The rotation of the motor 3 is transmitted to the rotary drum 1 securely mounted on the rotary shaft 17 so that the rotary drum 1 is rotated. Consequently, the magnetic head 4 mounted on the rotary drum 1 is rotated. A magnetic tape wrapped around and extending between outer circumferential portions of the rotary drum 1 and the stationary drum 2 is opposed to and contacts with the magnetic head 4.

In writing operation, a signal is transmitted from the circuit on the stationary side to the magnetic head 4 on the rotary drum 1 through the stator 16 and the rotor 15 of the writing rotary transformer 14. The signal is written on the magnetic tape. In contrast, in playback operation, a signal of the magnetic tape is read out by the magnetic head 4 and transmitted to the circuit of the stationary side through the rotor 7 and the stator 8 of the playback rotary transformer 6.

In the rotary head apparatus, a favorable characteristic is obtained by providing the playback rotary transformer 6 and the writing rotary transformer 14 in such a manner as shown in FIG. 3 and disposing them in a spaced relationship from each other by a distance as great as possible. Therefore, the rotary transformer 14 is accommodated in the inside of the stationary drum 2, and the playback rotary transformer 6 is disposed above the rotary drum 1.

With the arrangement just described, however, the stator 8 of the playback rotary transformer 6 disposed above the upper side rotary drum 1 must be secured to the rotary drum 1 using such separate structural parts as the mounting plate 10, arm 11, mounting bracket 12. Such a complicated structure as described above is unfavorable in terms of the facility in assembly and the accuracy in assembly and in terms of the cost. Further, the structure makes rework such as exchange of the magnetic head 4 or the like difficult. Particularly where the rotary head drum apparatus is designed for multi-channels and includes many heads, the possibility that a trouble may occur is high. Further, since the playback rotary transformer 6 which has a considerable weight is provided above the rotary drum 1, the rotary head drum apparatus is disadvantageous in dynamic balance and is not suitable for high speed rotation.

SUMMARY OF THE INVENTION

It is an object of the present invention to provide a rotary head drum apparatus and a magnetic recording and playback apparatus which are improved in facility in assembly and accuracy in assembly, facilitate rework of a head and the like and assure improved dynamic stability while eliminating the structure wherein one of a writing rotary transformer and a playback rotary transformer is mounted on the upper portion of the rotary drum with a mounting plate, an arm, a mounting bracket and the like.

In order to attain the object described above, according to an aspect of the present invention, there is provided a magnetic recording and playback apparatus and a rotary head drum apparatus, comprising a rotary drum having a head thereon, a stationary drum disposed coaxially with the rotary drum and having, on an outer circumferential face thereof, a guide face for a tape-type recording medium which is opposed to and contacts with the head, and a writing rotary transformer and a playback rotary transformer disposed in a neighboring relationship with each other in an axial direction with a shield plate interposed therebetween and accommodated in the stationary drum.

With the rotary head drum apparatus, upon replacement of the head, the writing rotary transformer and the playback rotary transformer need not be disassembled. Consequently, the rework facility upon replacement of the head is improved. Besides, otherwise possible crosstalk of a writing signal and a playback signal between the two rotary transformers is prevented by the shield plate, and external interference noise is prevented by the stationary drum. Further, since both of the writing rotary transformer and the playback rotary transformer each having large weight can be disposed in a concentrated manner in the stationary drum, the imbalance which may occur is little, and this facilitates balance adjustment upon assembly. Further, with the structure described, the gyro moment when the rotary transformers suffer from a disturbance during operation is small, and the stability upon high speed rotation is improved.

The rotary head drum apparatus may further comprise one of a writing circuit board and a playback circuit board disposed on an end face of the stationary drum. In this instance, the rotary head drum apparatus may further comprise a motor provided adjacent the end face of the stationary drum and having an output power shaft which serves also as a rotationally supporting shaft for the rotary drum, and a fan blade provided on an outer circumference side of a rotor of the motor for cooling the writing circuit board or playback circuit board disposed on the end face of the stationary drum. Alternatively, the rotary head drum apparatus may further comprise the other one of a writing circuit board and a playback circuit board disposed on an end portion of the rotary drum.

According to another aspect of the present invention, there is provided a magnetic recording and playback apparatus and a rotary head drum apparatus, comprising a rotary drum having a head thereon, a stationary drum disposed coaxially with the rotary drum and having, on an outer circumferential face thereof, a guide face for a tape-type recording medium which is opposed to and contacts with the head, a writing rotary transformer and a playback rotary transformer formed from flat disk-type rotary transformers independent of each other and disposed coaxially in a neighboring relationship with each other, and a shield plate interposed between the writing rotary transformer and the playback transformer.

With the rotary head drum apparatus, a writing signal is transferred by the flat disk-type writing rotary transformer, and a playback signal is transferred by the flat disk-type rotary transformer different from the flat disk-type writing rotary transformer. Besides, crosstalk between the two rotary transformers is prevented by the shield plate. Accordingly, an apparatus for transferring signals can be incorporated compactly using a pair of flat disk-type rotary transformers disposed coaxially in a neighboring relationship with each other.

According to a further aspect of the present invention, there is provided a magnetic recording and playback apparatus and a rotary head drum apparatus, comprising a rotary drum having a head thereon, a stationary drum disposed coaxially with the rotary drum and having, on an outer circumferential face thereof, a guide face for a tape-type recording medium which is opposed to and contacts with the head, and a writing rotary transformer and a playback rotary transformer one of which is formed from a flat disk-type rotary transformer and disposed on a bottom portion of the stationary drum and the other of which is formed from a cylindrical rotary transformer and disposed on an outer circumferential portion of a center boss of the stationary drum.

With the rotary head drum apparatus, a writing signal and a playback signal can be transferred separately from each other using a combination of a flat disk-type rotary transformer and a cylindrical rotary transformer. Besides, by disposing the two rotary transformers in the rotary drum, mechanisms for transferring the two different signals can be disposed separately from each other and compactly in the rotary head drum apparatus.

The rotary head drum apparatus may further comprise a shield plate interposed between an end face of the flat disk-type rotary transformer and an upper face of the cylindrical rotary transformer. The writing rotary transformer may be formed from a flat disk-type rotary transformer, and the playback rotary transformer may be formed from a cylindrical rotary transformer.

According to a preferred form of the present invention, the rotary head drum apparatus of the upper drum rotation type is configured such that flat disk-type rotary transformers for exclusive use for writing and for playback are disposed one on the other with a shield plate interposed therebetween, and besides the two rotary transformers are accommodated in the stationary drum. Since the form just described basically has a conventional structure, such factors that raise the cost such as the difficulty in assembly, additional structural parts and the number of man-hours for adjustment are eliminated, and besides the rework facility in replacement of a magnetic head provided on the rotary drum is improved.

Where a writing circuit board for processing a writing signal is disposed on an end face of the stationary drum just below the writing rotary transformer, the loss of a writing signal can be reduced. Further, where a motor is provided below the writing circuit board for processing a writing signal and fan blades are attached to an outer circumference of a rotor of the motor, the writing circuit board can be cooled with wind blasted by the fan blades thereby to radiate the heat.

With the form described above, since flat disk-type rotary transformers for exclusive use for writing and for playback are disposed one on the other with a shield plate interposed therebetween and besides the two rotary transformers are accommodated in the stationary drum, a rotary head drum apparatus of a structure basically same as the structure of a conventional rotary head drum apparatus can be formed. Therefore, the facility in assembly and the rework facility upon replacement of the head of the upper drum and the like are improved. Further, since the two rotary transformers are disposed in the stationary drum, electric shielding by the stationary drum is achieved, and this structure is advantageous against interference noise. Further, since the two rotary transformers each having large weight can be disposed in a concentrated manner at a place in the stationary drum, the imbalance which may occur is little, and this facilitates balance adjustment upon assembly. Further, the gyro moment when the rotary transformers suffer from a disturbance during operation is small, and the stability particularly upon high speed rotation is improved.

Particularly in such a conventional rotary head structure as described above with reference to FIG. 3 which is of the shaft rotation type and wherein the rotary drum 1 is disposed on the upper side, if the rotary transformer 6 is added above the rotary drum 1, then a securing structure for the stator 8 of the rotary transformer 6 which includes such mechanical parts as the mounting bracket 12 is required. In contrast, according to the present invention, such mechanism parts are not required. Therefore, the rotary head drum apparatus of the present invention is much advantageous in terms of the cost, the facility in assembly, additional adjustment and the like. Further, possible output variation caused by a disturbance such as vibrations from a mechanical deck or an impact is reduced.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
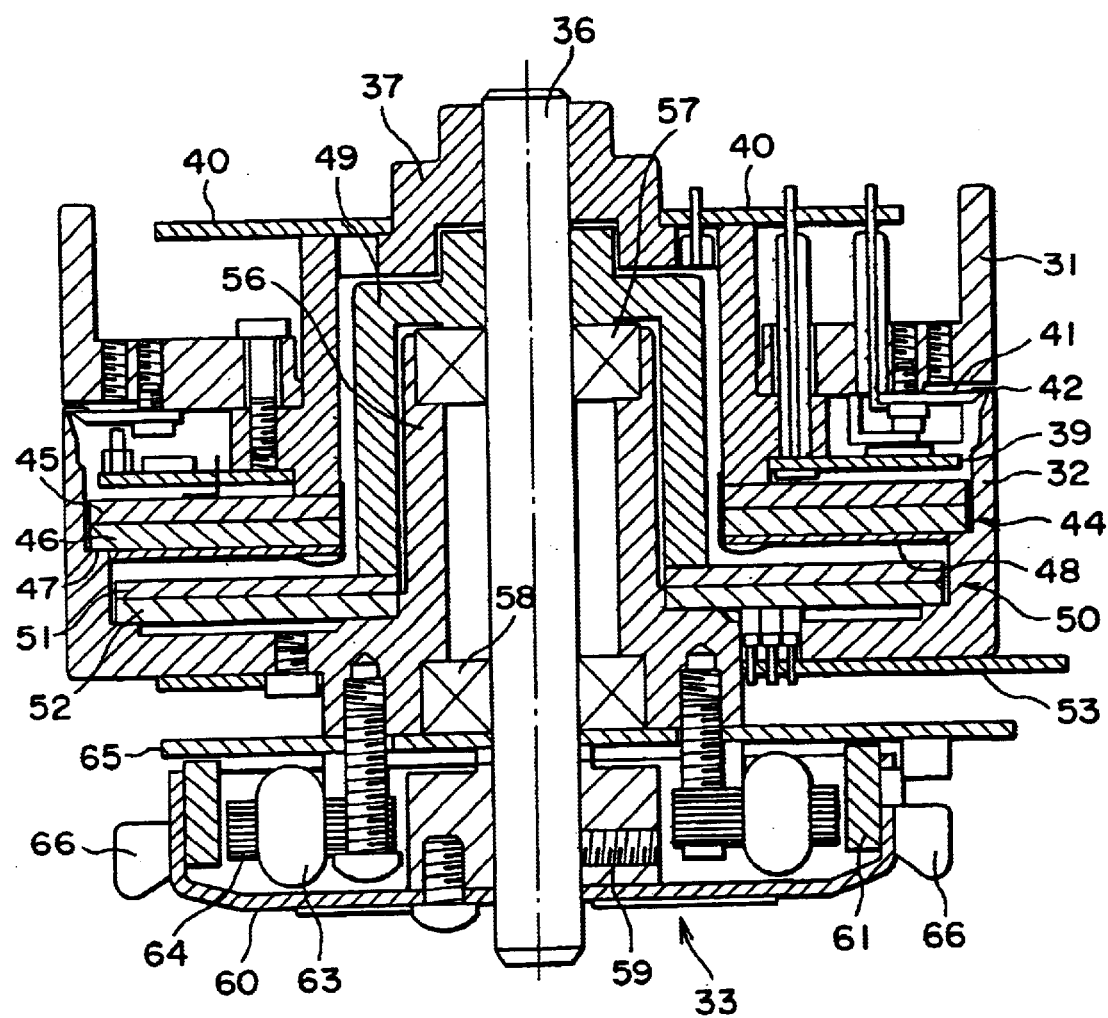
FIG. 1 is a vertical sectional view of a rotary head drum apparatus to which the present invention is applied.

Hereinafter, embodiments of the present invention will be described with reference to the accompanying drawings. Referring to FIG. 1, there is shown a rotary head drum apparatus to which the present invention is applied. The rotary head drum apparatus includes a rotary drum 31, a stationary drum 32, and a motor 33. The rotary drum 31 is secured to a rotary shaft 36 by a flange 37 such that it rotates together with the rotary shaft 36.

A playback circuit board 39 is disposed below the rotary drum 31 and supported at a lower portion of the flange 37. A terminal printed circuit board (PRT board) 40 is securely mounted at an upper portion of the rotary drum 31. A magnetic head 42 is mounted on a lower face of the rotary drum 31 through a head base 41.

A playback rotary transformer 44 is disposed below the rotary drum 31 on the inner side of the stationary drum 32. A rotor 45 of the playback rotary transformer 44 is secured to a lower end portion of the flange 37, and a stator 46 of the playback rotary transformer 44 is supported at a stepped portion 47 of the stationary drum 32. A shield plate 48 is disposed on the lower side of the stator 46 of the playback rotary transformer 44. The shield plate 48 is formed in an upwardly bend configuration such that it extends along a portion of a center hole of the playback rotary transformer 44 from a lower face of the stator 46.

A writing rotary transformer 50 is disposed in the inside of the stationary drum 32 such that it is positioned below the playback rotary transformer 44. A rotor 51 of the writing rotary transformer 50 is secured to a lower end of a flange 49 securely mounted on the rotary shaft 36. A stator 52 of the writing rotary transformer 50 is attached directly to a bottom portion of the stationary drum 32. A writing circuit board 53 is disposed below the stationary drum 32 and connected to the stator 52 of the writing rotary transformer 50.

The rotary shaft 36 is supported for rotation on a tubular center boss 56 provided continuously to a central portion of the stationary drum 32 by means of a pair of ball bearings 57 and 58. The rotary shaft 36 extends downwardly and serves also as an output power shaft of the motor 33. A rotor boss 59 is secured to a portion adjacent a lower end of the rotary shaft 36, and a cup-shaped rotor yoke 60 is mounted on the rotor boss 59. A ring-shaped magnet 61 is secured to an inner circumference of the rotor yoke 60.

A stator core 64 having a coil 63 wound thereon is disposed on the inner side of the rotor yoke 60 in an opposing relationship to an inner circumferential face of the magnet 61 with a small air gap left therebetween. The stator core 64 is mounted on a printed circuit board 65. Fan blades 66 are provided on an outer circumference of the rotor yoke 60.

In the rotary head drum apparatus having the configuration described above, when the coil 63 of the motor 33 is energized from a circuit on the printed circuit board 65, then the ring-shaped magnet 61 is acted upon by force in its rotating direction and rotated thereby. The rotation is transmitted to the rotary drum 31 through the rotary shaft 36. Accordingly, the rotary drum 31 having the magnetic head 42 thereon is rotated. Thereupon, a magnetic tape is fed in a state wherein it is helically wound on outer circumferential faces of the rotary drum 31 and the stationary drum 32, and consequently, the magnetic head 42 helically scan the magnetic tape.

Upon writing operation, a writing signal is sent from the stator 52 to the rotor 51 of the writing rotary transformer 50 and then sent to the magnetic head 42, whereafter it is written onto the magnetic tape by the magnetic head 42. On the other hand, upon playback operation, a playback signal read out by the magnetic head 42 is amplified by the circuit on the playback circuit board 39 and transmitted from the rotor 45 of the playback rotary transformer 44 to the stationary side circuit through the stator 46.

In this manner, the rotary head drum apparatus shown in FIG. 1 is a rotary head apparatus of the upper drum rotation type, and the two rotary transformers 50 and 44 for a writing signal and a playback signal are disposed in the lower side stationary drum 32 with the shield plate 48 interposed therebetween. The playback circuit board 39 and the terminal printed circuit board 40 are provided on the rotary drum 31, and the writing circuit board 53 is disposed on the lower face of the stationary drum 32. Further, the motor 33 directly coupled to the rotary shaft 36 is provided below the stationary drum 32, and the fan blades 66 provided on the rotor yoke 60 of the motor 33 send cooling wind to the writing circuit board 53.

As flows of signals, a recording signal is supplied from the writing circuit board 53 to the magnetic head 42 through the writing rotary transformer 50 and the terminal printed circuit board (TPC board) 40. On the other hand, a playback signal from the magnetic head 42 is amplified by the circuit of the playback circuit board 39 and then sent to the playback rotary transformer 44.

Now, assembly and rework facility of such a rotary head drum apparatus as described above will be described. First, the stator 52 of the writing rotary transformer 50 is adhered to the stationary drum 32, and the flange 49 to which the rotor 51 of the writing rotary transformer 50 is adhered is force fitted with the rotary shaft 36. Then, the stator 46 of the playback rotary transformer 44 having the shield plate 48 disposed on the lower side thereof is adhered to the stepped portion 47 of the stationary drum 32. Thereafter, the flange 37 to which the rotor 45 of the playback rotary transformer 44 is adhered is force fitted with the rotary shaft 36. Finally, the rotary drum 31 on which the magnetic head 42 is mounted is fastened in the flange 37 by means of screws, and the TPC board 40 is fastened by means of screws or by soldering to the flange 37, thereby completing the rotary head drum apparatus.

The structure described above is basically equivalent to a structure which includes a rotary transformer in addition to a conventional rotary head drum apparatus of the upper drum rotation type which includes a single rotary transformer. Therefore, replacement of the magnetic head 42 is similar to that in the conventional rotary head drum which includes a single rotary transformer. In particular, if the TPC board 40 is removed from the flange 37 and then the rotary drum 31 is removed, then the magnetic head 42 can be replaced. Consequently, the magnetic head 42 can be replaced without disassembling the playback rotary transformer 44 or the writing rotary transformer 50. Consequently, rework facility of the magnetic head 42 is improved significantly.

Further, since the playback rotary transformer 44 and the writing rotary transformer 50 are disposed one on the other with the shield plate 48 interposed therebetween, deterioration of a characteristic by interference, crosstalk or the like between the two rotary transformers 44 and 50 is prevented. Further, since both of the two rotary transformers 44 and 50 are disposed in the lower side stationary drum 32, the electric shielding performance of them is raised by the stationary drum 32, and this is advantageous against interference noise. Besides, since both of the rotary transformers 44 and 50 each having great weight can be disposed in a concentrated manner in the stationary drum 32, the imbalance which may occur is little, and this facilitates balance adjustment upon assembly. Further, the gyro moment when the rotary transformers 44 and 50 suffer from a disturbance during operation is small, and the stability particularly upon high speed rotation is improved significantly.

Figure 2:
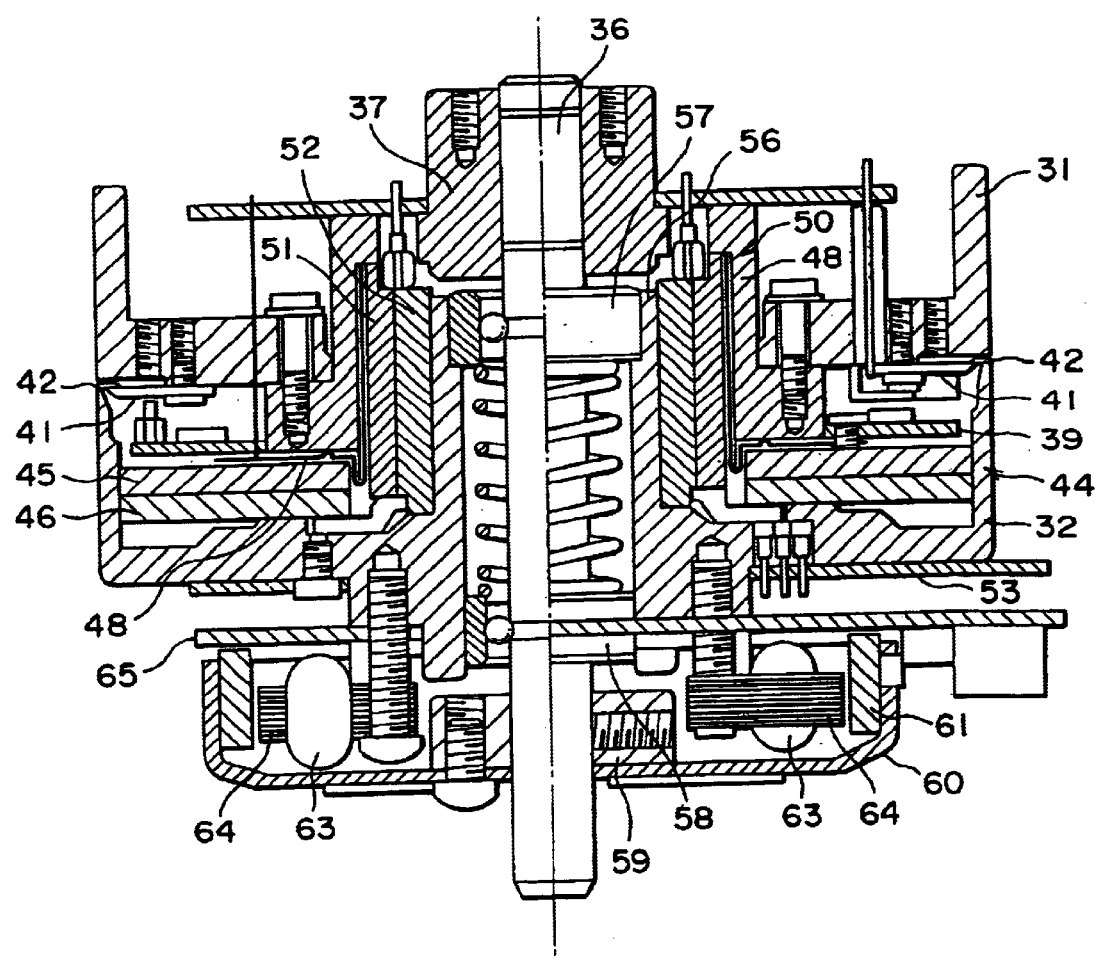
FIG. 2 is a similar view but showing another rotary head drum apparatus to which the present invention is applied.
Figure 3:
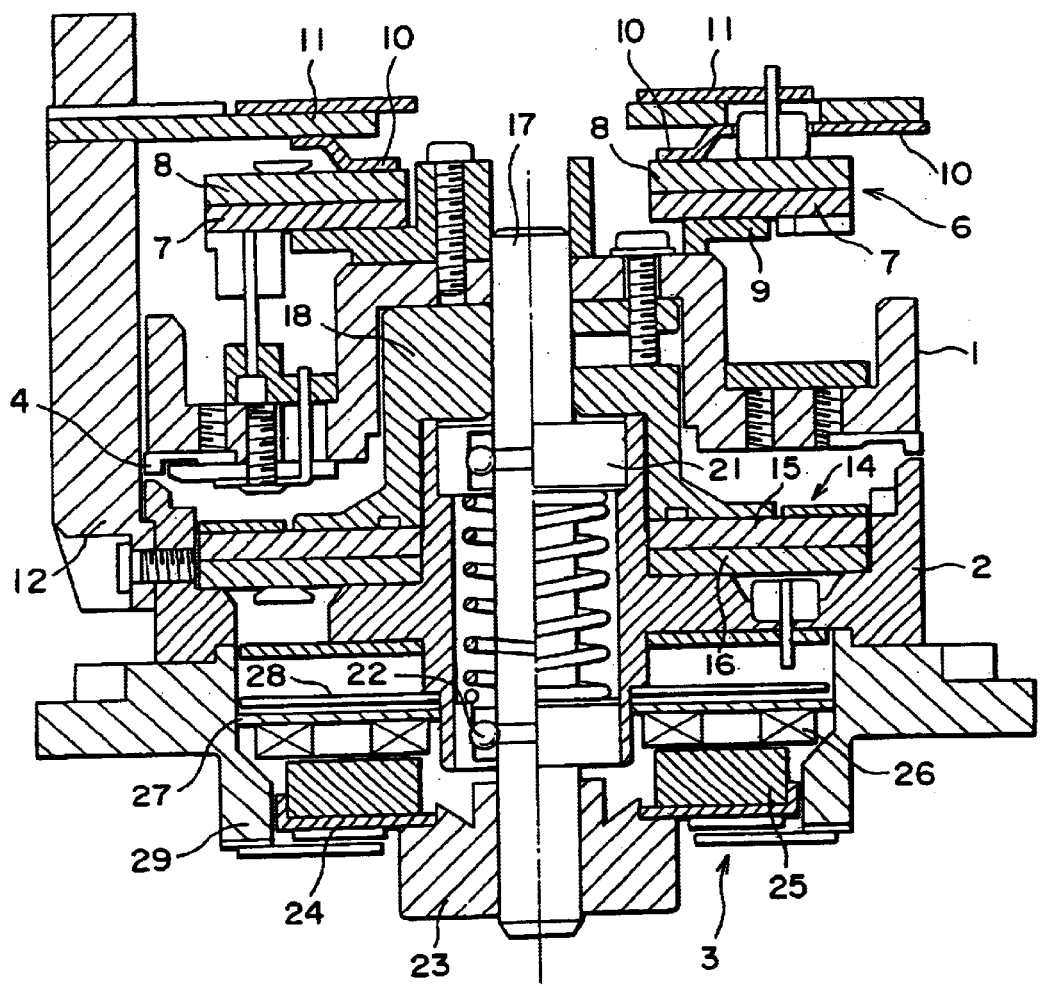
FIG. 3 is a similar view but showing a conventional rotary head drum apparatus.

Referring now to FIG. 2, there is shown another rotary head drum apparatus to which the present invention is applied. The rotary head drum apparatus of the present embodiment is a modification to and has a basically common configuration to that of the rotary head drum apparatus of the first embodiment described above with reference to FIG. 1. Thus, in the following description, only different features of the rotary head drum apparatus of the present embodiment are described.

In particular, the rotary head drum apparatus of the present embodiment is characterized in that the playback rotary transformer 44 is formed from a flat disk type rotary transformer while the writing rotary transformer 50 is formed from a cylindrical rotary transformer. The rotary transformers 44 and 50 are mounted in the stationary drum 32.

Here, particularly the rotor 51 of the writing rotary transformer 50 is secured to the inner circumferential face of the flange 37. On the other hand, the stator 52 is secured to the outer circumferential face of the center boss 56 of the stationary drum 32. The shield plate 48 is disposed such that it extends from an outer circumferential portion of the rotor 51 of the writing rotary transformer 50 to an upper face of the rotor 45 of the playback rotary transformer 44 so as to prevent crosstalk of the two rotary transformers 44 and 50. Meanwhile, the rotor 45 of the playback rotary transformer 44 is secured to the lower face of the flange 37, and the stator 46 of the playback rotary transformer 44 is mounted directly on the bottom portion of the stationary drum 32.

Also in the rotary head drum apparatus having the configuration described above, both of the rotary transformers 44 and 50 are accommodated in a neighboring relationship with each other in the stationary drum 32 with the shield plate 48 interposed therebetween. Thus, the rotary transformers 44 and 50 need not be disassembled upon replacement of the magnetic head 42, and consequently, the rework facility of the magnetic head 42 is not disturbed. Besides, the crosstalk between the rotary transformers 44 and 50 is prevented by the shield plate 48, and the rotary transformers 44 and 50 can be shielded from interference noise by the stationary drum 32 and/or the rotary drum 31.

Since the playback rotary transformer 44 is disposed on the bottom portion of the stationary drum 32 and the writing rotary transformer 50 is disposed on the center boss 56 of the stationary drum 32, the imbalance which may occur is little, and this facilitates balance adjustment upon assembly. Further, the gyro moment when the rotary transformers 44 and 50 suffer from a disturbance during operation is small, and high speed rotation in high stability can be achieved.

While preferred embodiments of the present invention have been described using specific terms, such description is for illustrative purposes only, and it is to be understood that changes and variations may be made without departing from the spirit or scope of the following claims.

What is claimed is:

1. A rotary head drum apparatus, comprising:
   a rotary drum adapted for contact with a tape-type recording medium and having a head mounted thereon;
   a stationary drum disposed coaxially with said rotary drum and having a guide face on an outer circumferential surface of said stationary drum for the tape-type recording medium that is opposed to and that contacts said head of said rotary drum;
   a write, flat, disk-type rotary transformer and a playback, flat disk-type rotary transformer arranged inside said stationary drum, wherein said write, flat, disk-type rotary transformer and said playback, flat, disk-type rotary transformer are independent and are disposed coaxially, adjacently, and with all flat surfaces thereof being substantially mutually parallel; and
   a flat shield plate affixed to said stationary drum and being interposed between said write rotary transformer and said playback transformer.

2. The rotary head drum apparatus according to claim 1, further comprising one of a write circuit board and a playback circuit board disposed on an end face of said stationary drum.

3. The rotary head drum apparatus according to claim 2, further comprising a motor provided adjacent to said end face of said stationary drum and having an output power shaft that serves as a rotationally supporting shaft for said rotary drum and a fan blade provided on an outer circumference side of a rotor of said motor for cooling one of said write circuit board and said playback circuit board disposed on said end face of said stationary drum.

4. The rotary head drum apparatus according to claim 2, further comprising an other of said write circuit board and said playback circuit board disposed on an end portion of said rotary drum.

5. A magnetic recording and playback apparatus, comprising:
   a rotary head drum apparatus around which a tape-type recording medium is wound; and a head mounted on said rotary head drum apparatus, said head being opposed to and contacting said tape-type recording medium to effect recording and playback of said tape-type recording medium, wherein said rotary head drum apparatus includes: a rotary drum adapted for contact with the tape-type recording medium and having said head mounted thereon; a stationary drum disposed coaxially with said rotary drum and having a guide face on an outer circumferential surface of said stationary drum for said tape-type recording medium that is opposed to and that contacts said head mounted on said rotary drum; and a write, flat, disk-type rotary transformer and a playback, flat, disk-type rotary transformer disposed adjacently in an axial direction, so that all flat surfaces thereof are substantially mutually parallel, with a flat shield plate affixed to said stationary drum and being interposed between said write rotary transformer and said playback rotary transformer that are accommodated in said stationary drum.

6. The magnetic recording and playback apparatus according to claim 5, wherein said rotary head drum apparatus further includes one of a write circuit board and a playback circuit board disposed on an end face of said stationary drum.

7. The magnetic recording and playback apparatus according to claim 6, wherein said rotary head drum apparatus further includes: a motor provided adjacent to said end face of said stationary drum and having an output power shaft that serves as a rotationally supporting shaft for said rotary drum; and a fan blade provided on an outer circumference side of a rotor of said motor for cooling said write circuit board and said playback circuit board disposed on said end face of said stationary drum.

8. The magnetic recording and playback apparatus according to claim 6, wherein said rotary head drum apparatus further includes an other of said write circuit board and said playback circuit board disposed on an end portion of said rotary drum.

* * * * *